US008275398B2

(12) United States Patent
Boningue et al.

(10) Patent No.: US 8,275,398 B2
(45) Date of Patent: Sep. 25, 2012

(54) MESSAGE ADDRESSING TECHNIQUES FOR A MOBILE COMPUTING DEVICE

(75) Inventors: Benoit Boningue, Mountain View, CA (US); Richard J. Donald, Brentwood, CA (US); Lang Chen, Oakland, CA (US); Rob Katcher, Sunnyvale, CA (US); Phil McClendon, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1108 days.

(21) Appl. No.: 11/934,450

(22) Filed: Nov. 2, 2007

(65) Prior Publication Data

US 2009/0117942 A1 May 7, 2009

(51) Int. Cl.
*H04W 4/00* (2009.01)
(52) U.S. Cl. .............. 455/466; 455/564; 455/550.1; 455/412.1; 455/566
(58) Field of Classification Search ............ 455/564, 455/466, 550.1, 412.1, 566, 557, 445, 435.1; 379/88.21, 359; 715/839; 705/26
See application file for complete search history.

(56) References Cited

U.S. PATENT DOCUMENTS

| 2005/0020270 | A1* | 1/2005 | Buckley | 455/445 |
|---|---|---|---|---|
| 2007/0287484 | A1* | 12/2007 | Chava et al. | 455/466 |
| 2008/0102864 | A1* | 5/2008 | Donoghue | 455/466 |
| 2008/0103918 | A1* | 5/2008 | Burnette et al. | 705/26 |
| 2008/0301585 | A1* | 12/2008 | Murray et al. | 715/839 |
| 2009/0069037 | A1* | 3/2009 | Gan et al. | 455/466 |
| 2009/0264152 | A1* | 10/2009 | Soderlund | 455/557 |

* cited by examiner

*Primary Examiner* — Kathy Wang-Hurst

(57) ABSTRACT

Various embodiments are directed to improved message addressing techniques. In one embodiment, a computing device may comprise a messaging client arranged to receive an input sequence of alphabetic or alphanumeric characters as a destination of an outbound message. The messaging client may recognize that the input sequence represents a mnemonic short code and may automatically generate a common short code comprising a sequence of numeric digits associated with the mnemonic short code. The messaging client may display both the input sequence comprising the mnemonic short code and the common short code and enable the outbound message to be sent using the common short code as the destination. Other embodiments are described and claimed.

19 Claims, 4 Drawing Sheets

```
RECEIVE AN INPUT SEQUENCE OF ALPHABETIC OR
ALPHANUMERIC CHARACTERS REPRESENTING A
MNEMONIC SHORT CODE AS A DESTINATION OF AN
OUTBOUND MESSAGE
402
```

```
RECOGNIZE THAT THE INPUT SEQUENCE
REPRESENTS A MNEMONIC SHORT CODE
404
```

```
AUTOMATICALLY GENERATE A COMMON SHORT CODE
COMPRISING A SEQUENCE OF NUMERIC DIGITS
ASSOCIATED WITH THE MNEMONIC SHORT CODE
406
```

```
DISPLAY THE INPUT SEQUENCE COMPRISING THE
MNEMONIC SHORT CODE AND
THE COMMON SHORT CODE
408
```

```
SEND THE OUTBOUND MESSAGE USING THE COMMON
SHORT CODE AS THE DESTINATION
410
```

FIG. 4

MESSAGE ADDRESSING TECHNIQUES FOR A MOBILE COMPUTING DEVICE

BACKGROUND

Short Message Service (SMS) messaging is a form of communication supported by most mobile telephone service providers and widely available on various networks including Global System for Mobile Communications (GSM), Code Division Multiple Access (CDMA), Time Division Multiple Access (TDMA), and third generation (3G) networks. SMS messaging is described in GSM specifications such as GSM specification 03.40 "Digital cellular telecommunications system (Phase 2+); Technical realization of the Short Message Service" and GSM specification 03.38 "Digital cellular telecommunications system (Phase 2+); Alphabets and language-specific information."

In general, SMS messages from a sender are transmitted to a Short Message Service Center (SMSC) which provides a store-and-forward mechanism for delivering the SMS message to one or more recipients. An SMS message from a sender may contain an SMS header including a destination telephone number and a payload containing the text portion of the message. Typically, the payload of an SMS message is limited by the supporting network infrastructure and communication protocol to no more than 140 bytes which translates to 160 7-bit characters based on a default 128-character set defined in GSM specification 03.38, 140 8-bit characters, or 70 16-bit characters for languages such as Arabic, Chinese, Japanese, Korean, and other double-byte languages.

Due to payload limitations, a long message having more than 140 bytes or 160 7-bit characters may be delivered as separate SMS messages. In some cases, the SMS infrastructure may support concatenation allowing a long message to be sent and received as multiple concatenated SMS messages. In such cases, the payload of each concatenated SMS message is limited to 140 bytes but also includes a user data header (UDH) prior to the text portion of the message. The UDH contains segmentation information for allowing the recipient to reassemble the multiple concatenated SMS messages into a single long message.

The text content of an SMS message may contain alphanumeric characters as well as iconic characters (e.g. smiley characters) made up of a combination of standard punctuation marks such as a colon, dash, and open bracket for a smile. Iconic characters may be selected by the sender, sent as punctuation equivalents, and deciphered back into iconic representations at the recipient. The text content of an SMS messages also may include certain classes of hidden messages reserved for use by network operators and push e-mail clients to control data or events on the terminal.

Multimedia Messaging (MMS) technology provides capabilities beyond those of SMS and allows users to send and receive multimedia messages including graphics, video and audio clips. Unlike SMS, which depends primarily on the underlying wireless network technology (e.g. GSM, CDMA, TDMA), MMS relies on Internet Protocol (IP) technology and is designed to work with mobile packet data services such as General Packet Radio Service (GPRS) and Evolution Data Only/Evolution Data Optimized (EV-DO).

In addition to full-length (e.g., 10-digit) telephone numbers, a common short code (CSC) also can be used as a destination to address SMS and/or MMS messages. A CSC is a shorter telephone number ranging from four to six numeric digits and is commonly used in the context of mobile services. While a CSC is easier to memorize than a full-length telephone number, to make it even easier to remember, the CSC may be designed or chosen as a mnemonic short code including a word or other pattern of letters and numbers that map to the numbers of a standard 12-key telephone keypad (1=none, 2=ABC, 3=DEF, 4=GHI, 5=JKL, 6=MNO, 7=PQRS, 8=TUV, 9=WXYZ, *=none, 0=none, #=none). When using a standard 12-key telephone keypad, a user may address an SMS or MMS message simply by pressing the keys associated with each letters and/or number of the mnemonic short code.

Some mobile computing devices such as smart phones enable users to compose SMS and MMS messages using a full QWERTY keyboard. For many of such devices, however, the keys of the QWERTY keyboard do not provide standard 12-key telephone keypad functionality. Consequently, addressing SMS or MMS messages when using a full QWERTY keyboard requires the user to know the actual numeric digits of the CSC. This can be cumbersome especially in cases where the user knows a mnemonic short code but has to look at the layout of a standard 12-key telephone keypad to get the numeric digits of the CSC corresponding to the letters of a word before addressing the message.

Accordingly, there is a need for improved message addressing techniques for a mobile computing device.

DETAILED DESCRIPTION

Various embodiments are directed to improved message addressing techniques. In one embodiment, a computing device may comprise a messaging client arranged to receive an input sequence of alphabetic or alphanumeric characters as a destination of an outbound message. The messaging client may recognize that the input sequence represents a mnemonic short code and may automatically generate a common short code comprising a sequence of numeric digits associated with the mnemonic short code. The messaging client may display both the input sequence comprising the mnemonic short code and the common short code and enable the outbound message to be sent using the common short code as the destination.

The messaging client may associate numeric digits with the alphabetic characters of the input sequence by parsing the input sequence into alphabetic and numeric characters and translating the alphabetic characters of the input sequence into numeric digits by mapping the alphabetic characters to the number digits of a standard 12-key telephone keypad layout.

When composing a message, a user may enter the input sequence into an address field of a messaging user interface using a full QWERTY keyboard. Upon navigating away from the address field or entering a delimiter (e.g., comma, semicolon, etc.), the messaging client validates the input sequence and begins translation. In some implementations, the messaging client may recognize that the input sequence represents a mnemonic short code based on the length of the input sequence, such as when the input sequence comprises between four and six characters.

Figure 1:
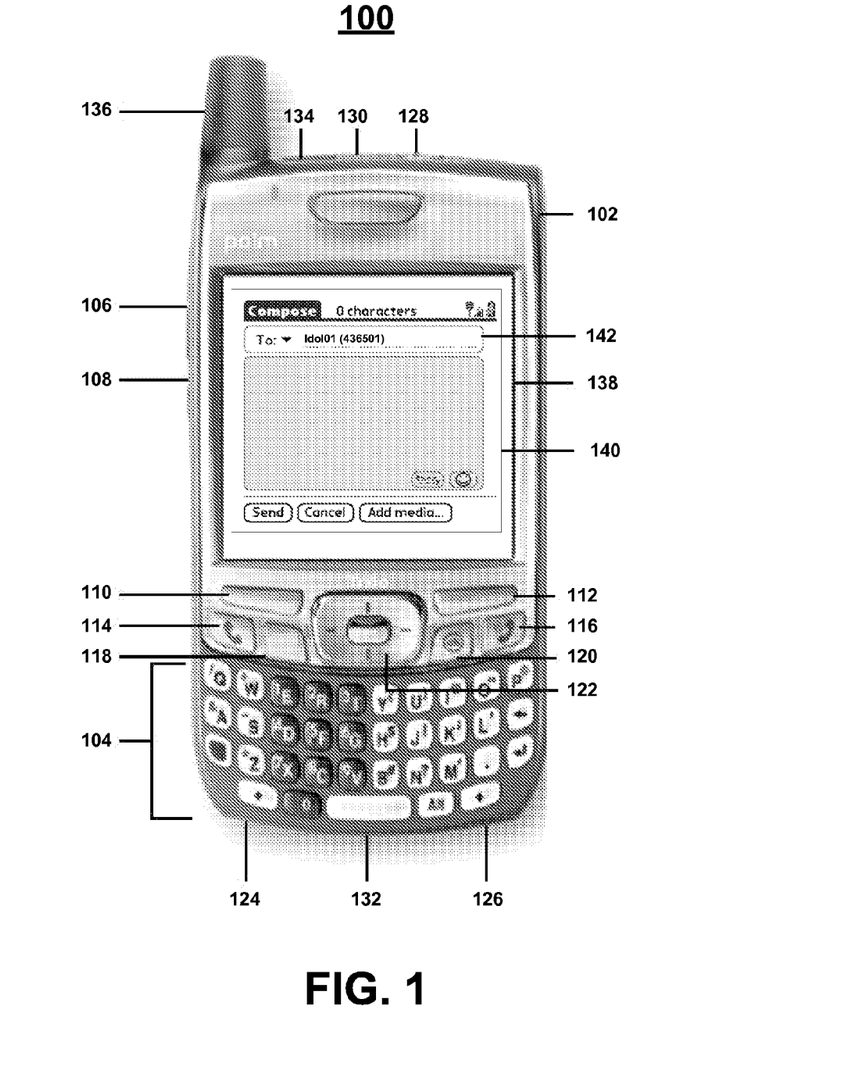
FIG. 1 illustrates one embodiment of a mobile computing device.

FIG. 1 illustrates a mobile computing device 100 suitable for implementing various embodiments. The mobile computing device 100 may comprise or be implemented as a combination handheld computer and mobile telephone or smart phone such as a Palm® Treo™ smart phone. Although some embodiments may be described with the mobile computing device 100 implemented as a smart phone by way of example, it may be appreciated that the mobile computing device 100 may be implemented as other types of wireless computing devices having voice and/or data communications functionality such as a handheld device, personal digital assistant (PDA), mobile telephone, combination mobile telephone/PDA, mobile unit, subscriber station, game device, messaging device, media player, pager, or any other suitable communications device in accordance with the described embodiments.

The mobile computing device 100 may comprise a housing 102 encapsulating various internal components such as a printed circuit board (PCB), internal antennas, a removable and rechargeable battery (e.g., lithium ion battery), as well as one or more processors (e.g., host processor, radio processor, modem processor, baseband processor), memory (e.g., volatile or non-volatile memory, removable or non-removable memory, erasable or non-erasable memory, writeable or re-writeable memory), transceivers (e.g., voice communications transceiver, data communications transceiver, GPS transceiver), and others. The housing 102 may be formed from materials such as plastic, metal, ceramic, glass, and others which are suitable for enclosing and protecting the internal components of the mobile computing device 100.

The mobile computing device 100 may comprise an alphanumeric keyboard 104 having a QWERTY key layout and an integrated number dial pad. In various embodiments, the alphanumeric keyboard 104 may be used for addressing and composing various types of messages including SMS and MMS messages. As shown, the QWERTY key layout and integrated number dial pad of the alphanumeric keyboard 104 comprise keys that function alternately as letters and numbers. It can be appreciated that the alternate number/letter keys (e.g., $E^1$, $R^2$, $T^3$, $D^4$, $F^5$, $G^6$, $X^7$, $C^8$, $V^9$, and 0) of the keyboard 104 do not function identically to a standard 12-key telephone keypad.

The mobile computing device 100 may comprise various buttons such as, for example, a volume button 106, a customizable button 108, a left action button 110, a right action button 112, a phone/send button 114, a power/end button 116, a start button 118, an OK button 120, and a navigation button 122. The navigation button 122 may be used to input navigation information from the user corresponding to left, right, up, down, and select commands to navigate among and within various graphical user interfaces and/or to select available functions or menu items displayed to a user. It is to be appreciated that multi-directional navigation functionality may be implemented using elements other than the navigation button 122, such as a 4-, 5-, or 8-way multi-directional touch pad, a joystick, an accelerometer for detecting directional commands, soft keys, and/or any other type of navigation elements in accordance with the described embodiments.

The mobile computing device 100 may comprise various devices that support audio/video (A/V) capability such as an audio port 124 to connect an audio headset, a microphone 126, one or more speakers, an audio coder/decoder (codec), an audio player, a Musical Instrument Digital Interface (MIDI) device, a digital camera, a video camera, a video codec, a video player, and so forth. The mobile computing device 100 may comprise and a ringer on/off switch 128 having a vibrate mode. The mobile computing device 100 also may comprise an expansion slot 130 to support a memory card such as a secure digital (SD) card, multimedia memory card (MMC), and/or any other type of storage card in accordance with the described embodiments.

The mobile computing device 100 may comprise an antenna system implemented by one or more internal antennas (not shown) and/or external antennas, such as a stub antenna 136. In various embodiments, the antenna system may comprise one or more internal and/or external antennas tuned for operating at one or more frequency bands so that the mobile computing device 100 may be compatible with multiple wireless data, multimedia, and/or cellular telephone networks or systems.

The mobile computing device 100 may comprise a display 138 implemented by a LCD or other type of suitable visual interface. The display 138 may comprise, for example, a touch-sensitive color (e.g., 16-bit color) display screen such as a thin-film transistor (TFT) LCD. In various embodiments, the display 138 may be arranged to present a messaging graphical user interface (GUI) 140 to a user.

The messaging GUI 140 may comprise an address field 142 for receiving an input sequence of alphabetic or alphanumeric characters as a destination of an outbound message. A user may enter the input sequence into the address field 142 using the keyboard 104. The input sequence may comprise, for example, alphabetic or alphanumeric characters representing a mnemonic short code. The mnemonic short code may comprise a word or other pattern of letters and numbers that map to the numbers of a standard 12-key telephone keypad (1=none, 2=ABC, 3=DEF, 4=GHI, 5=JKL, 6=MNO, 7=PQRS, 8=TUV, 9=WXYZ, *=none, 0=none, #=none). It can be appreciated that the input sequence may comprise upper and lower case letters as well as numbers.

In some implementations, the input sequence may be recognized as representing a mnemonic short code when the input sequence includes between four and six characters. It can be appreciated, however, that the input sequence may comprise any number of characters in accordance with the described embodiments. For example, in some embodiments, input sequences including between three and fifteen characters may be recognized.

The absence of certain characters in the input sequence may support mnemonic short code recognition. For example, the absence of an @ character in the input sequence may indicate that input sequence is not an e-mail address and support mnemonic short code recognition. In some embodiments, the input sequence may be recognized as representing a mnemonic short code when the input sequence does not match entries in a contacts database arranged to store contact records for individuals or entities specified by the user of the mobile computing device 100. In other embodiments, mnemonic short code recognition may preempt reverse look up using contact records.

Upon navigating away from the address field 142 or entering a delimiter (e.g., comma, semicolon, etc.) after the input sequence, the input sequence is validated and translated into a common short code comprising a sequence of numeric digits associated with the mnemonic short code. Numeric digits may be associated with the alphabetic characters of the input sequence by parsing the input sequence into alphabetic and numeric characters and translating the alphabetic characters of the input sequence into numeric digits by mapping the alphabetic characters to the number digits of a standard 12-key telephone keypad layout. Numeric characters of the input sequence typically will not require translation.

As shown, for purposes of illustration, an exemplary input sequence (e.g., Idol01) comprising alphanumeric characters is recognized as representing a mnemonic short code. In response, a common short code (e.g., 436501) comprising a sequence of numeric digits associated with the mnemonic short code is automatically generated. The messaging GUI 104 displays both the input sequence (e.g., Idol01) comprising the mnemonic short code and the common short code (e.g., 436501) comprising the sequence of numeric digits in parenthesis. The outbound message may be sent using the common short code (e.g., 436501) as the destination.

Figure 2:
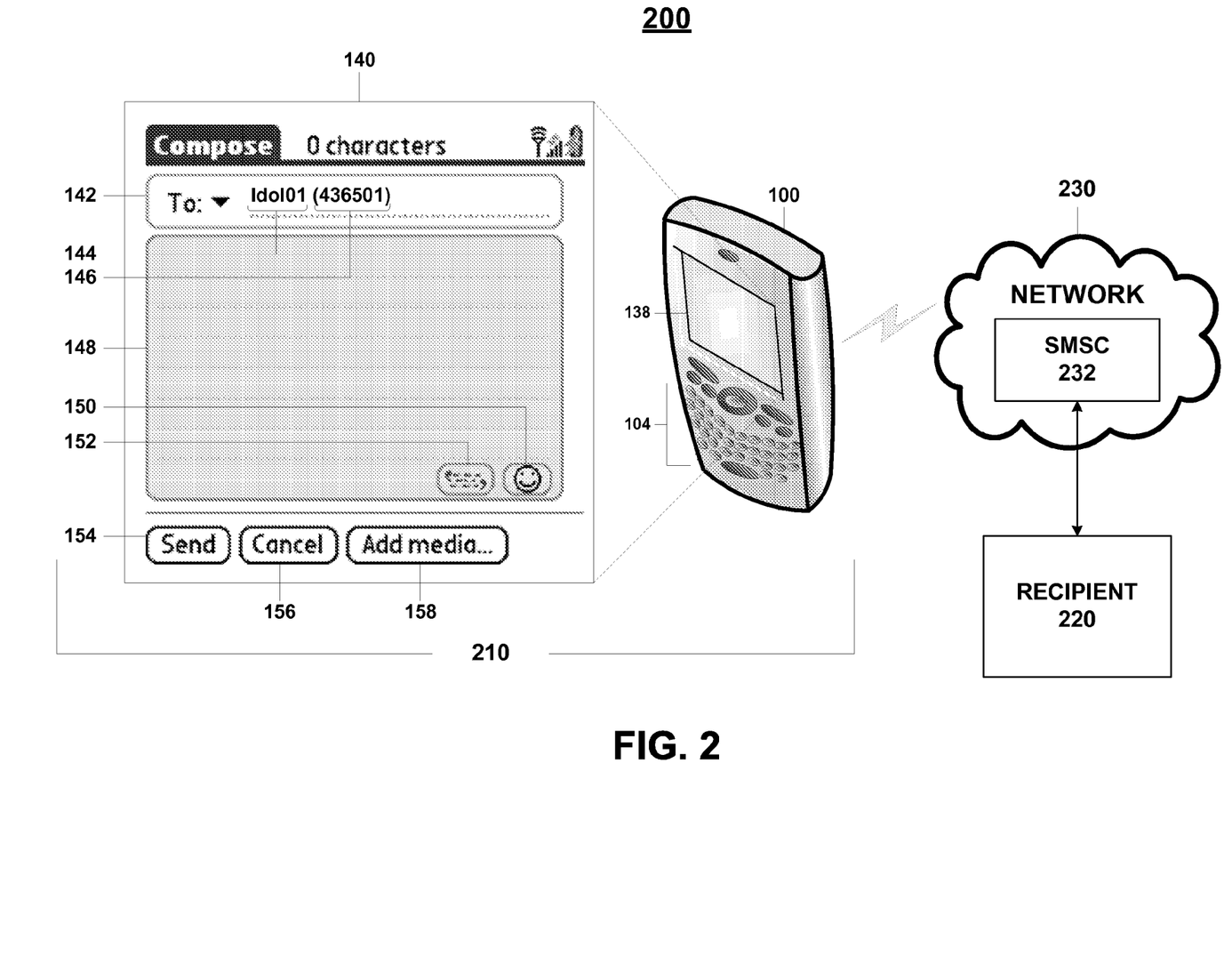
FIG. 2 illustrates one embodiment of a messaging system.

FIG. 2 illustrates a messaging system 200 suitable for implementing various embodiments. Although FIG. 2 includes a limited number of elements for purposes of illustration, it can be appreciated that the messaging system 200 may include more or less elements as well as other types of elements. While some embodiments and examples may be described in the context of SMS messaging, it can be appreciated that the principles and techniques may be implemented for other types of messaging and within other types of communications systems in accordance with the described embodiments.

As shown, the messaging system 200 may include a sender computing terminal 202 communicating with a recipient computing terminal 220 over a network 230. The network 230 may comprise any type of network (e.g., GSM, CDMA, TDMA, 3G, etc.) that supports messaging in accordance with the described embodiments. In some implementations, the network 230 may support WWAN data communication services such as one or more cellular data communication services (e.g., GSM/GPRS, CDMA/1xRTT, EDGE, EVDO, EV-DV, HSDPA, etc.).

In various embodiments, the network 230 may be arranged to operate using the underlying infrastructure for standard SMS messaging and to abide by the 140 byte and/or 160 character payload constraints for standard SMS message content. As shown, the network 230 may comprise Short Message Service Center (SMSC) 232 arranged to operate in accordance with the standard SMS infrastructure and to provide a store-and-forward mechanism for receiving an SMS message from the sender computing terminal 210 and delivering the SMS message to the recipient computing terminal 220.

It can be appreciated one or more alternate transport mechanisms such as Unstructured Supplementary Service Data (USSD) may be employed within the SMS context in some implementations. In general, USSD is handled by the same transport mechanism as SMS but avoids the need to employ the store-and-forward capability of SMSC 232. Accordingly, USSD messaging may allow faster communication among paired devices in some cases. In some implementations, SMS may be used as an initial transport mechanism and switched to USSD if supported by the network.

Each of the computing terminals may comprise or be implemented as various devices such as a mobile computing device, personal computer (PC), server-based computer, laptop computer, notebook computer, tablet PC, handheld computer, landline telephone, mobile telephone, personal digital assistant (PDA), combination mobile telephone/PDA, television device, set top box (STB), a gaming console, mobile unit, subscriber station, media player, pager, messaging device, data communication device, consumer electronics (CE) device, A/V equipment, home automation equipment, or any other suitable computing or processing system in accordance with the described embodiments.

In the exemplary embodiment shown in FIG. 2, the recipient computing terminal 220 may be implemented as a server or other computing device or system arranged to receive an SMS message addressed to a particular CSC. The particular CSC may be designed or chosen as a mnemonic short code including a word or other pattern of letters and/or numbers that maps to the numbers on a standard 12-key telephone keypad. The recipient computing terminal 220 may support one or more mobile services such as text voting, ordering media objects (e.g. ringtones, songs, videos, maps, etc.), polling, making donations, making reservations, submitting queries, and so forth.

The sender computing terminal 210 may be implemented as an SMS enabled mobile devices, such as mobile computing device 100. The mobile computing device 100 may comprise an alphanumeric keyboard 104 for addressing and composing an SMS message and a display 138 for presenting messaging GUI 140 to a user. In various embodiments, the alphanumeric keyboard 104 may comprise a QWERTY key layout and an integrated number dial pad.

As shown, the messaging GUI 140 may comprise an address field 142 such as a 'To' field for entering a destination address. In some embodiments, the 'To' field may be arranged to display a contact name by performing a reverse look up in the contact records of the user by destination address. In some cases, the address field 142 may comprise other items such as a 'CC' field, a 'BCC' field, a subject field, status line (e.g., message priority, receipt status, errors, receipt request, validity period), callback number, and so forth.

In various embodiments, a user may enter an input sequence 144 into the address field 142 (e.g., 'To' field) as a destination of an outbound message. The user may enter the input sequence 144 using the alphanumeric keyboard 104. The input sequence 144 may comprise, for example, alphabetic or alphanumeric characters representing a mnemonic short code. The mnemonic short code may comprise a word or other pattern of letters and numbers that map to the numbers of a standard 12-key telephone keypad.

As shown, for purposes of illustration, an exemplary input sequence 144 (e.g., Idol01) is entered into the address field 142. Upon navigating away from the address field 142 or entering a delimiter (e.g., comma, semicolon, etc.) after the input sequence 144, the input sequence 144 is determined to be a valid entry for a destination address and recognized as representing a mnemonic short code.

In some implementations, the input sequence 144 may be recognized as representing a mnemonic short code when including between four and six characters. It can be appreciated, however, that the input sequence 144 may comprise any number of characters in accordance with the described embodiments. For example, in some embodiments, input sequences including between three and fifteen characters may be recognized.

The absence of certain characters, such as an @ character, in the input sequence 144 may indicate that input sequence 144 is not an e-mail address and support mnemonic short code recognition. In some embodiments, the input sequence 144 may be recognized as representing a mnemonic short code when the input sequence 144 does not match entries in a contacts database arranged to store contact records for individuals or entities specified by the user of the mobile computing device 100. In other embodiments, mnemonic short code recognition may preempt reverse look up using contact records.

Once recognized as a mnemonic short code, the input sequence 144 (e.g., Idol01) comprising alphanumeric characters is parsed into alphabetic (e.g., I, d, o, and l) and numeric (0 and 1) characters. It can be appreciated that the input sequence 144 may comprise upper and lower case letters as well a numbers. Numeric digits may be associated with the alphabetic characters of the input sequence 144 by mapping each of the alphabetic characters (e.g., I, d, o, and l) to the number digits of a standard 12-key telephone keypad layout (1=none, 2=ABC, 3=DEF, 4=GHI, 5=JKL, 6=MNO, 7=PQRS, 8=TUV, 9=WXYZ, *=none, 0=none, #=none). In this example, the alphabetic characters map to number digits as follows: I=4, d=3, o=6, and l=5. The numeric characters (e.g., 0 and 1) of the input sequence 144 do not require translation.

A common short code 146 (e.g., 436501) comprising a sequence of numeric digits associated with the mnemonic short code is generated. The messaging GUI 104 displays both the input sequence 144 (e.g., Idol01) representing the mnemonic short code and the common short code 146 (e.g., 436501) comprising the sequence of numeric digits associated with the mnemonic short code in parenthesis.

After composing a message, the common short code 146 (e.g., 436501) may be used as the destination of an outbound message. As shown, the messaging GUI 140 may comprise a message composition area 148 for entering SMS message text content and may indicate total message length. The messaging GUI 140 also may comprise an emoticon button 150 for displaying a pop-up list of emoticons that can be inserted into the text area a text button 152 for displaying a pop-up list of boilerplate text strings that can be inserted into messages and edited and. The messaging GUI 140 may comprise a send button 154 for sending the message and a cancel button 156 for canceling the message.

The messaging UI 140 also may comprise an add media button 158 to allow the user to add media objects such as pictures, video, and/or sounds to a message. When the user selects to add media, the user may be presented with a picture/video recorder picker and/or a sound recorder or picker. In some cases, the user may be presented with an intermittent dialog warning the user about the fact that the messaging service might charge more for delivering media objects.

In some embodiments, the messaging GUI 140 may be arranged to display various menu items or soft keys in response to pressing a menu button or by tapping and holding the screen, for example. Exemplary menu items or soft keys may include, without limitation, Send, Add Recipient, Insert, My Text, Emoticons, Add Media, Add Picture, Add Video, Add Sound, Pick Sound, Record Sound, Add Callback Number, Add vCard, Add vCal, Clear, Select All, Paste, Copy, Cut, Undo, Save to Drafts, Save as Template, Spell Check, Check Names, Cancel Message, Message Options, and so forth.

In some embodiments, the messaging UI 140 may enable a user to compose messages of different types of formats using the same unified messaging UI. For example, the messaging UI 140 may comprise a unified messaging UI for SMS messages and MMS messages. In some implementations, the unified messaging UI may be implemented to support using various types of messages and messaging applications. In such implementations, the message options soft key may enable the user to select among various types of message conversions and/or delivery methods for sending a composed message. For example, the user may compose a message in one format (e.g., e-mail, IM, etc.) and then convert or send the message in another format (e.g., SMS, MMS, etc.) In some cases, the conversion of a message from one format to a particular sending format may be based on programmed and/or detected preferences, constraints, and/or availability of a recipient to receive messages of a certain format.

Figure 3:
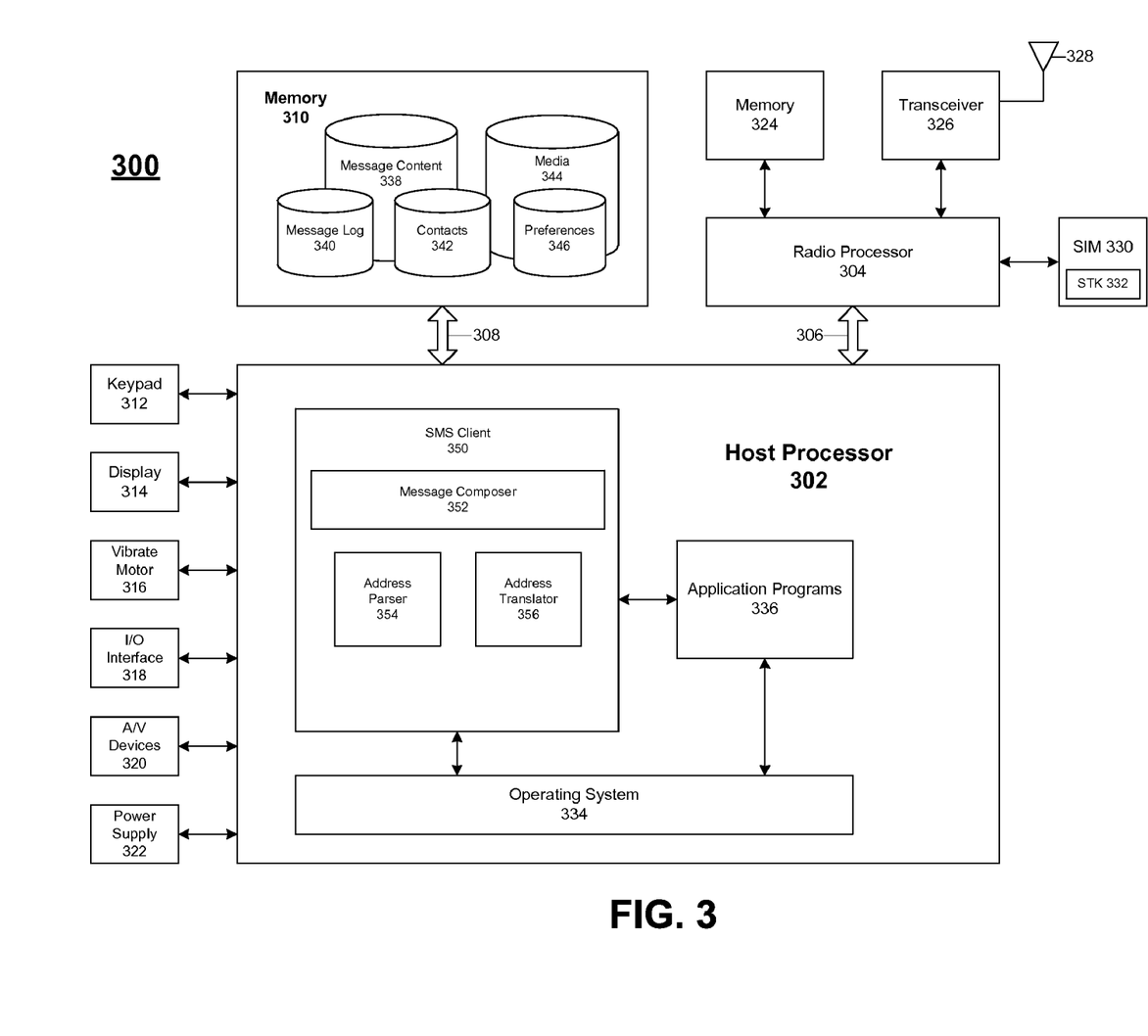
FIG. 3 illustrates one embodiment of a mobile computing device.

FIG. 3 illustrates a block diagram of a mobile computing device 300 suitable for implementing various embodiments, including the mobile computing device 100. It may be appreciated that the mobile computing device 300 is only one example of a suitable mobile computing environment and is not intended to suggest any limitation as to the scope of use or functionality of the embodiments. Neither should the mobile computing device 300 be interpreted as having any dependency or requirement relating to any one or combination of components illustrated in the exemplary mobile computing device 300. Further, while some embodiments may be described in the context of SMS messaging, the principles and techniques may be implemented for other types of messaging and within other types of communications systems in accordance with the described embodiments.

The mobile computing device 300 may provide voice and/or data communications functionality in accordance with different types of cellular radiotelephone systems. Examples of cellular radiotelephone systems may include Code Division Multiple Access (CDMA) systems, Global System for Mobile Communications (GSM) systems, North American Digital Cellular (NADC) systems, Time Division Multiple Access (TDMA) systems, Extended-TDMA (E-TDMA) systems, Narrowband Advanced Mobile Phone Service (NAMPS) systems, 3G systems such as Wide-band CDMA (WCDMA), CDMA-2000, Universal Mobile Telephone System (UMTS) systems, and so forth.

In addition to voice communications functionality, the mobile computing device 300 may be arranged to provide mobile packet data communications functionality in accordance with different types of cellular radiotelephone systems. Examples of cellular radiotelephone systems offering mobile packet data communications services may include GSM with General Packet Radio Service (GPRS) systems (GSM/GPRS), CDMA/1xRTT systems, Enhanced Data Rates for Global Evolution (EDGE) systems, Evolution Data Optimized (EVDO) systems, Evolution For Data and Voice (EVDV) systems, High Speed Downlink Packet Access (HSDPA) systems, High Speed Uplink Packet Access (HSUPA), and so forth.

The mobile computing device 300 may be arranged to provide voice and/or data communications functionality in accordance with different types of wireless network systems or protocols. Examples of suitable wireless network systems offering data communication services may include the Institute of Electrical and Electronics Engineers (IEEE) 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, and so forth. The mobile computing device 300 may also utilize different types of shorter range wireless systems, such as a Bluetooth system operating in accordance with the Bluetooth Special Interest Group (SIG) series of protocols, including Bluetooth Specification versions v1.0, v1.1, v1.2, v10, v2.0 with Enhanced Data Rate (EDR), as well as one or more Bluetooth Profiles, and so forth. Other examples may include systems using infrared techniques or near-field communication techniques and protocols, such as electromagnetic induction (EMI) techniques. An example of EMI techniques may include passive or active radio-frequency identification (RFID) protocols and devices.

As shown in the embodiment of FIG. 3, the mobile computing device 300 may comprise a dual processor architecture including a host processor 302 and a radio processor 304. In various implementations, the host processor 302 and the radio processor 304 may be arranged to communicate with each other using interfaces 306 such as one or more universal serial bus (USB) interfaces, micro-USB interfaces, universal asynchronous receiver-transmitter (UART) interfaces, general purpose input/output (GPIO) interfaces, control/status lines, control/data lines, audio lines, and so forth.

The host processor 302 may be responsible for executing various software programs such as system programs and applications programs to provide computing and processing operations for the mobile computing device 300. The radio processor 304 may be responsible for performing various voice and data communications operations for the mobile computing device 300 such as transmitting and receiving voice and data information over one or more wireless communications channels. Although the mobile computing device 300 is shown with a dual-processor architecture, it may be appreciated that the mobile computing device 300 may use any suitable processor architecture and/or any suitable number of processors in accordance with the described embodiments. In one embodiment, for example, the processors 302, 304 may be implemented using a single integrated processor.

The host processor 302 may be implemented as a host central processing unit (CPU) using any suitable processor or logic device, such as a as a general purpose processor. The host processor 302 may also be implemented as a chip multiprocessor (CMP), dedicated processor, embedded processor, media processor, input/output (I/O) processor, co-processor, microprocessor, controller, microcontroller, application specific integrated circuit (ASIC), field programmable gate array (FPGA), programmable logic device (PLD), or other processing device in accordance with the described embodiments.

As shown, the host processor 302 may be coupled through a memory bus 308 to a memory 310. The memory bus 308 may comprise any suitable interface and/or bus architecture for allowing the host processor 302 to access the memory 310. Although the memory 310 may be shown as being separate from the host processor 302 for purposes of illustration, it is worthy to note that in various embodiments some portion or the entire memory 310 may be included on the same integrated circuit as the host processor 302. Alternatively, some portion or the entire memory 310 may be disposed on an integrated circuit or other medium (e.g., hard disk drive) external to the integrated circuit of the host processor 302. In various embodiments, the mobile computing device 300 may comprise an expansion slot to support a multimedia and/or memory card, for example.

The memory 310 may be implemented using any computer-readable media capable of storing data such as volatile or non-volatile memory, removable or non-removable memory, erasable or non-erasable memory, writeable or re-writeable memory, and so forth. Examples of computer-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other type of media suitable for storing information.

The mobile computing device 300 may comprise an alphanumeric keypad 312 coupled to the host processor 302. The keypad 312 may comprise, for example, a QWERTY key layout and an integrated number dial pad. The mobile computing device 300 also may comprise various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, and so forth. The keypad 312 may comprise a physical keypad using hard buttons, or a virtual keypad using soft buttons displayed on a display 314.

The mobile computing device 300 may comprise a display 314 coupled to the host processor 302. The display 314 may comprise any suitable visual interface for displaying content to a user of the mobile computing device 300. In one embodiment, for example, the display 314 may be implemented by a liquid crystal display (LCD) such as a touch-sensitive color (e.g., 36-bit color) thin-film transistor (TFT) LCD screen. The touch-sensitive LCD may be used with a stylus and/or a handwriting recognizer program.

The mobile computing device 300 may comprise a vibrate motor 316 coupled to the host processor 302. The vibrate motor 316 may be enable or disabled according to the preferences of the user of the mobile computing device 300. When enabled, the vibrate motor 316 may cause the mobile computing device 300 to move or shake in a generic and/or patterned fashion in response to a triggering event such as the receipt of a telephone call, text message, an alarm condition, a game condition, and so forth. Vibration may occur for a fixed duration and/or periodically according to a pulse.

The mobile computing device 300 may comprise an input/output (I/O) interface 318 coupled to the host processor 302. The I/O interface 318 may comprise one or more I/O devices such as a serial connection port, an infrared port, integrated Bluetooth wireless capability, and/or integrated 802.11x (WiFi) wireless capability, to enable wired (e.g., USB cable) and/or wireless connection to a local computer system, such as a local personal computer (PC). In various implementations, mobile computing device 300 may be arranged to synchronize information with a local computer system.

The host processor 302 may be coupled to various audio/video (A/V) devices 320 that support A/V capability of the mobile computing device 300. Examples of A/V devices 320 may include, for example, a microphone, one or more speakers, an audio port to connect an audio headset, an audio coder/decoder (codec), an audio player, a Musical Instrument Digital Interface (MIDI) device, a digital camera, a video camera, a video codec, a video player, and so forth.

The host processor 302 may be coupled to a power supply 322 arranged to supply and manage power to the elements of the mobile computing device 300. In various embodiments, the power supply 322 may be implemented by a rechargeable battery, such as a removable and rechargeable lithium ion battery to provide direct current (DC) power, and/or an alternating current (AC) adapter to draw power from a standard AC main power supply.

The radio processor 304 may be arranged to communicate voice information and/or data information over one or more assigned frequency bands of a wireless communication channel. The radio processor 304 may be implemented as a communications processor using any suitable processor or logic device, such as a modem processor or baseband processor. The radio processor 304 may also be implemented as a digital signal processor (DSP), media access control (MAC) processor, or any other type of communications processor in accordance with the described embodiments. The radio processor 304 may perform analog and/or digital baseband operations for the mobile computing device 300. For example, the radio processor 304 may perform digital-to-analog conversion (DAC), analog-to-digital conversion (ADC), modulation, demodulation, encoding, decoding, encryption, decryption, and so forth.

The mobile computing device 300 may comprise a memory 324 coupled to the radio processor 304. The memory 324 may be implemented using any of the computer-readable media described with reference to the memory 310. The memory 324 may be typically implemented as flash memory and secure digital (SD) RAM. Although the memory 324 may be shown as being separate from the radio processor 304, some or all of the memory 324 may be included on the same IC as the radio processor 304.

The mobile computing device 300 may comprise a transceiver module 326 coupled to the radio processor 304. The transceiver module 326 may comprise one or more transceivers arranged to communicate using different types of protocols, communication ranges, operating power requirements, RF sub-bands, information types (e.g., voice or data), use scenarios, applications, and so forth. In various embodiments, the transceiver module 326 may comprise one or more transceivers arranged to support voice communications and/or data communications for the wireless network systems or protocols as previously described. In some embodiments, the transceiver module 326 may further comprise a Global Positioning System (GPS) transceiver to support position determination and/or location-based services.

The transceiver module 326 generally may be implemented using one or more chips as desired for a given implementation. Although the transceiver module 326 may be shown as being separate from and external to the radio processor 304 for purposes of illustration, it is worthy to note that in various embodiments some portion or the entire transceiver module 326 may be included on the same integrated circuit as the radio processor 304. The embodiments are not limited in this context.

The mobile computing device 300 may comprise an antenna system 328 for transmitting and/or receiving electrical signals. As shown, the antenna system 328 may be coupled to the radio processor 304 through the transceiver module 326. The antenna system 328 may comprise or be implemented as one or more internal antennas and/or external antennas.

The mobile computing device 300 may comprise a subscriber identity module (SIM) 330 coupled to the radio processor 304. The SIM 330 may comprise, for example, a removable or non-removable smart card arranged to encrypt voice and data transmissions and to store user-specific data for allowing a voice or data communications network to identify and authenticate the user. The SIM 330 also may store data such as personal settings specific to the user. In some embodiments, the SIM 330 may be implemented as an UMTS universal SIM (USIM) card or a CDMA removable user identity module (RUIM) card. The SIM 330 may comprise a SIM application toolkit (STK) 332 comprising a set of programmed commands for enabling the SIM 330 to perform various functions. In some cases, the STK 332 may be arranged to enable the SIM 330 to independently control various aspects of the mobile computing device 300.

As mentioned above, the host processor 302 may be arranged to provide processing or computing resources to the mobile computing device 300. For example, the host processor 302 may be responsible for executing various software programs including system programs such as operating system (OS) 334 and application programs 336. System programs generally may assist in the running of the mobile computing device 300 and may be directly responsible for controlling, integrating, and managing the individual hardware components of the computer system. The OS 334 may be implemented, for example, as a Palm OS®, Palm OS® Cobalt, Microsoft® Windows OS, Microsoft Windows® CE OS, Microsoft Pocket PC OS, Microsoft Mobile OS, Symbian OS™, Embedix OS, Linux OS, Binary Run-time Environment for Wireless (BREW) OS, JavaOS, a Wireless Application Protocol (WAP) OS, or other suitable OS in accordance with the described embodiments. The mobile computing device 300 may comprise other system programs such as device drivers, programming tools, utility programs, software libraries, application programming interfaces (APIs), and so forth.

Application programs 336 generally may allow a user to accomplish one or more specific tasks. In various implementations, the application programs 336 may provide one or more graphical user interfaces (GUIs) to communicate information between the mobile computing device 300 and a user. In some embodiments, application programs 336 may comprise upper layer programs running on top of the OS 334 of the host processor 302 that operate in conjunction with the functions and protocols of lower layers including, for example, a transport layer such as a Transmission Control Protocol (TCP) layer, a network layer such as an Internet Protocol (IP) layer, and a link layer such as a Point-to-Point (PPP) layer used to translate and format data for communication.

Examples of application programs 336 may include, without limitation, messaging applications, web browsing applications, personal information management (PIM) applications (e.g., contacts, calendar, scheduling, tasks), word processing applications, spreadsheet applications, database applications, media applications (e.g., video player, audio player, multimedia player, digital camera, video camera, media management), gaming applications, and so forth. Messaging applications may be arranged to communicate various types of messages in a variety of formats. Examples of messaging applications may include without limitation a cellular telephone application, a Voice over Internet Protocol (VoIP) application, a Push-to-Talk (PTT) application, a voicemail application, a facsimile application, a video teleconferencing application, an IM application, an e-mail application, an SMS application, an MMS application, and so forth. It is also to be appreciated that the mobile computing device 300 may implement other types of applications in accordance with the described embodiments.

The mobile computing device 300 may include various databases implemented in the memory 310. For example, the mobile computing device 300 may include a message content database 338, a message log database 340, a contacts database 342, a media database 344, a preferences database 346, and so forth. The message content database 338 may be arranged to store content and attachments (e.g., media objects) for various types of messages sent and received by one or more messaging applications. The message log 340 may be arranged to track various types of messages which are sent and received by one or more messaging applications. The contacts database 342 may be arranged to store contact records for individuals or entities specified by the user of the mobile computing device 300. The media database 344 may be arranged to store various types of media content such as image information, audio information, video information, and/or other data. The preferences database 346 may be arranged to store various settings such as rules and parameters for controlling the operation of the mobile computing device 300.

As show in FIG. 3, the mobile computing device 300 may comprise or implement an SMS client 350 arranged to send and receive SMS messages. In various embodiments, the SMS client 350 may be implemented by one or more hardware components, software components, and/or combination thereof. For example, the SMS client 350 may be implemented by SMS logic (e.g., instructions, data, and/or code) such as software to be executed by a logic device such as the processor 302 of the mobile computing device 300.

The SMS logic may be stored internally or externally to a logic device on one or more types of computer-readable storage media such as memory 310, memory, memory 324, and so forth. In some embodiments, SMS logic may be implemented by the SIM 330. For example, the SIM 330 may comprise a STK 332 configured to act as a security layer for the SMS client 350 and/or as part of the mechanism for message interpretation or alteration. The SIM 330 also may comprise an elementary file (EF) storing the SMS messaging capabilities of the mobile computing device 300.

In general, the SMS client 350 may be used to compose and send an SMS message to one or more remote devices. The SMS client 350 may be arranged to record inbound and outbound SMS traffic by destination address. For example, SMS client 350 may record SMS traffic in the message log 340 implemented by a database in memory 310. The message log 340 may be arranged to maintain a history that records addresses and the date/time of inbound and outbound SMS messages. The SMS client 350 also may be arranged to access the message content database 338 and/or the contacts database 342 when receiving and/or sending various types of messages.

As shown, the SMS client 350 may comprise several functional components or modules for performing various operations. It can be appreciated that such components or modules may be implemented by one or more hardware components, software components, and/or combination thereof. The functional components and/or modules may be implemented, for example, by logic (e.g., instructions, data, and/or code) to be executed by a logic device (e.g., processor). Such logic may be stored internally or externally to a logic device on one or more types of computer-readable storage media.

It also is to be appreciated that the described embodiments illustrate exemplary implementations, and that the functional components and/or modules may be implemented in various other ways which are consistent with the described embodiments. Furthermore, the operations performed by such components or modules may be combined and/or separated for a given implementation and may be performed by a greater number or fewer number of components or modules.

The SMS client 350 may comprise a message composer module 352 to support the composition and sending of outbound SMS messages including new messages and reply messages. The composer module 352 may be arranged to receive user input from the keypad 312 and to present a messaging GUI on the display 314.

In various embodiments, the message composer module 352 may receive an input sequence entered into an address field of a messaging UI as a destination of an outbound message. The input sequence may comprise, for example, alphabetic or alphanumeric characters representing a mnemonic short code. The mnemonic short code may comprise a word or other pattern of letters and numbers that map to the numbers of a standard 12-key telephone keypad When the user navigates away from the address field or enters a delimiter (e.g., comma, semicolon, etc.) after the input sequence, the message composer module 352 may determine that the input sequence is a valid entry for a destination address and recognize the input sequence as representing a mnemonic short code. In some implementations, the message composer module 352 may recognize the input sequence as representing a mnemonic short code when including between four and six characters. It can be appreciated, however, that the input sequence may comprise any number of characters in accordance with the described embodiments. For example, in some embodiments, input sequences including between three and fifteen characters may be recognized.

The absence of certain characters, such as an @ character, in the input sequence may indicate that input sequence is not an e-mail address and support mnemonic short code recognition. In some embodiments, the input sequence may be recognized as representing a mnemonic short code when the input sequence does not match entries in a contacts database 342 arranged to store contact records for individuals or entities specified by the user of the mobile computing device 300. In other embodiments, mnemonic short code recognition may preempt reverse look up using contact records.

The SMS client 350 may comprise an address parser module 354 to parse the input sequence entered as the destination address. It can be appreciated that the input sequence may comprise upper and lower case letters as well a numbers. The address parser module 354 may be arranged to parse an alphabetic or alphanumeric input sequence recognized as a mnemonic short code into alphabetic and numeric characters.

The SMS client 350 may comprise an address translator module 356 to translate the input sequence representing a mnemonic short code into a common short code comprising a sequence of numeric digits associated with the mnemonic short code. The address translator module 356 may be arranged to associate numeric digits with the alphabetic characters parsed from of the input sequence by mapping each of the alphabetic characters to the number digits of a standard 12-key telephone keypad layout (1=none, 2=ABC, 3=DEF, 4=GHI, 5=JKL, 6=MNO, 7=PQRS, 8=TUV, 9=WXYZ, *=none, 0=none, #=none). The numeric characters of the input sequence may not require translation. The address translator module 356 may generate the common short code comprising a sequence of numeric digits associated with the mnemonic short code.

The composer module 352 may display both the input sequence representing the mnemonic short code and the common short code comprising the sequence of numeric digits associated with the mnemonic short code. After the message has been composed, the common short code may be used as the destination of an outbound message.

Figure 4:
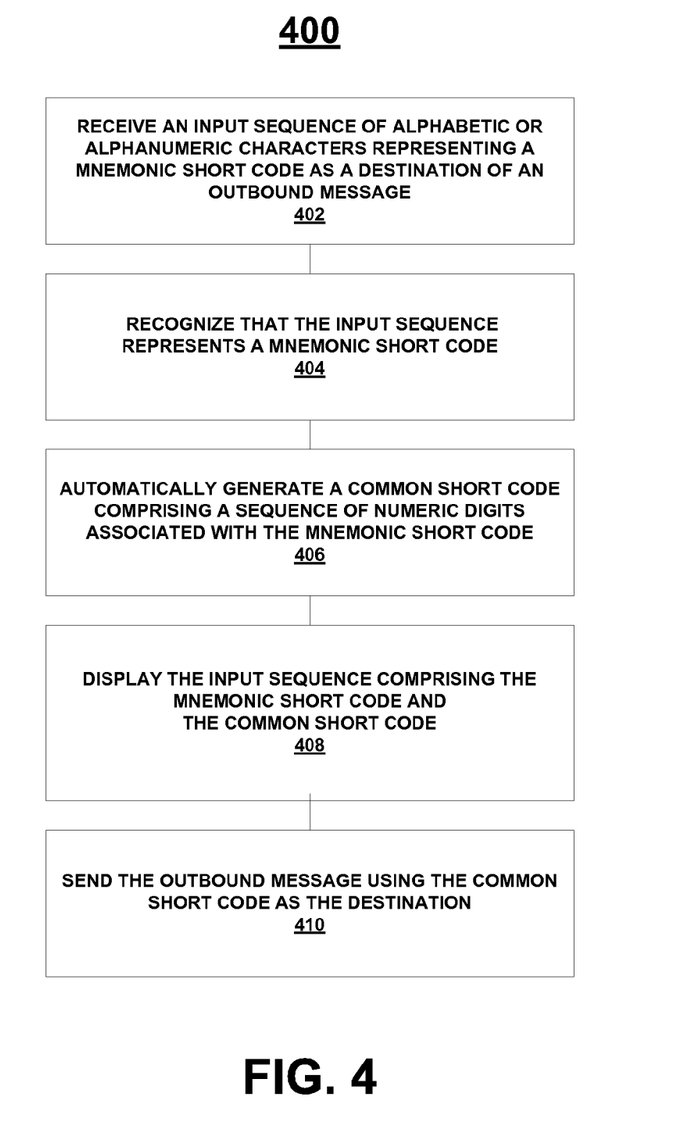
FIG. 4 illustrates one embodiment of a messaging logic flow.

FIG. 4 illustrates a messaging logic flow 400 in accordance with one or more embodiments. The logic flow 400 may be performed by various systems and/or devices and may be implemented as hardware, software, and/or any combination thereof, as desired for a given set of design parameters or performance constraints. For example, the logic flow 400 may be implemented by a logic device (e.g., processor) and/or logic comprising instructions, data, and/or code to be executed by a logic device.

The logic flow 400 may comprise receiving an input sequence of alphabetic or alphanumeric characters representing a mnemonic short code as a destination of an outbound message (block 402), recognizing that the input sequence represents a mnemonic short code (block 404), and automatically generating a common short code comprising a sequence of numeric digits associated with the mnemonic short code (block 406). In various embodiments, the logic flow 400 may comprise displaying both the input sequence comprising the mnemonic short code and the common short code (block 408) and sending the outbound message using the common short code as the destination (block 410).

When composing a message, a user may enter the input sequence into an address field of a messaging user interface using a full QWERTY keyboard. Upon navigating away from the address field or entering a delimiter (e.g., comma, semicolon, etc.), the input sequence may be validated and translated. In some implementations, the input sequence may be recognized as representing a mnemonic short code based on the length of the input sequence, such as when the input sequence comprise between four and six characters. Numeric digits may be associated with the alphabetic characters of the input sequence by parsing the input sequence into alphabetic and numeric characters and translating the alphabetic characters of the input sequence into numeric digits by mapping the alphabetic characters to the number digits of a standard 12-key telephone keypad layout.

In various embodiments, logic flow 400 may comprise, or be implemented as, executable computer program instructions. The executable computer program instructions may be implemented by software, a software module, an application, a program, a subroutine, instructions, an instruction set, computing code, words, values, symbols or combination thereof. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The executable computer program instructions may be implemented using any suitable high-level, low-level, object-oriented, visual, compiled and/or interpreted programming language, such as C, C++, Java, BASIC, Perl, Matlab, Pascal, Visual BASIC, assembly language, and others.

In various embodiments, logic flow 400 may comprise, or be implemented as, executable computer program instructions stored in an article of manufacture and/or computer-readable storage medium. The article and/or computer-readable storage medium may store executable computer program instructions that, when executed by a computer, cause the computer to perform methods and/or operations in accordance with the described embodiments. The article and/or computer-readable storage medium may be implemented by various systems and/or devices in accordance with the described embodiments.

The article and/or computer-readable storage medium may comprise one or more types of computer-readable storage media capable of storing data, including volatile memory or, non-volatile memory, removable or non-removable memory, erasable or non-erasable memory, writeable or re-writeable memory, and so forth. Examples of computer-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory, ovonic memory, ferroelectric memory, silicon-oxide-nitride-oxide-silicon (SONOS) memory, magnetic or optical cards, or any other suitable type of computer-readable media in accordance with the described embodiments.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments.

Although some embodiments may be illustrated and described as comprising exemplary functional components or modules performing various operations, it can be appreciated that such components or modules may be implemented by one or more hardware components, software components, and/or combination thereof.

Some of the figures may include a flow diagram. Although such figures may include a particular logic flow, it can be appreciated that the logic flow merely provides an exemplary implementation of the general functionality. Further, the logic flow does not necessarily have to be executed in the order presented unless otherwise indicated. In addition, the logic flow may be implemented by a hardware element, a software element executed by a computer, or any combination thereof.

Some embodiments may be implemented as an article of manufacture comprising a computer-readable storage medium to store executable computer program instructions for performing various operations as described herein. In such embodiments, a computer may include any suitable computer platform, device, system, or the like implemented using any suitable combination of hardware and/or software.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within registers and/or memories into other data similarly represented as physical quantities within the memories, registers or other such information storage, transmission or display devices.

It is worthy to note that some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, also may mean that two or more elements are not in direct contact with each other, but yet still co-operate or interact with each other. With respect to software elements, for example, the term "coupled" may refer to interfaces, message interfaces, API, exchanging messages, and so forth.

While certain features of the embodiments have been illustrated as described above, many modifications, substitutions, changes and equivalents will now occur to those skilled in the art. It is therefore to be understood that the appended claims are intended to cover all such modifications and changes as fall within the true spirit of the embodiments.

The invention claimed is:

1. An apparatus comprising:
a computing device comprising a messaging client to receive an input sequence of alphabetic or alphanumeric characters as a destination of an outbound message, the messaging client to recognize that the input sequence represents a mnemonic short code based on length of the input sequence and the lack of one or more special characters within the input sequence, and automatically generate a common short code comprising a sequence of numeric digits associated with the mnemonic short code, and the messaging client to display the input sequence comprising the mnemonic short code and the generated common short code in an address field of the messaging client.

2. The apparatus of claim 1, the messaging client to enable the outbound message to be sent using the common short code as the destination.

3. The apparatus of claim 1, the computing device including an alphanumeric keyboard comprising a QWERTY key layout.

4. The apparatus of claim 1, wherein length of the input sequence comprises between four and six characters.

5. The apparatus of claim 1, the messaging client to associate numeric digits with the alphabetic characters of the input sequence.

6. The apparatus of claim 5, the messaging client to map each of the alphabetic characters to the numeric digits according to a standard 12-key telephone keypad layout.

7. The apparatus of claim 1, the messaging client to parse the input sequence into alphabetic and numeric characters.

8. The apparatus of claim 1, the mnemonic short code comprising a word or pattern of letters that maps to numbers of a standard 12-key telephone keypad.

9. A computer-implemented method comprising:
receiving, from an input device, an input sequence of alphabetic or alphanumeric characters as a destination of an outbound message;
recognizing, by a processor, that the input sequence represents a mnemonic short code based on length of the input sequence and the lack of one or more special characters within the input sequence
automatically generating, by the processor, a common short code comprising a sequence of numeric digits associated with the mnemonic short code; and displaying, on a display, the input sequence comprising the mnemonic short code and the generated common short code in an address field.

10. The method of claim 9, comprising sending the outbound message using the common short code as the destination.

11. The method of claim 9, comprising receiving an input sequence entered using an alphanumeric keyboard comprising a QWERTY key layout.

12. The method of claim 9, comprising associating numeric digits with the alphabetic characters of the input sequence.

13. The method of claim 12, comprising mapping each of the alphabetic characters to the numeric digits according to a standard 12-key telephone keypad layout.

14. The method of claim 9, comprising parsing the input sequence into alphabetic and numeric characters.

15. The method of claim 9, the mnemonic short code comprising a word or pattern of letters that maps to numbers of a standard 12-key telephone keypad.

16. A computer-readable storage medium comprising executable computer program instructions that when executed enable a computing system to:
receive an input sequence of alphabetic or alphanumeric characters as a destination of an outbound message;
recognize that the input sequence represents a mnemonic short code based on length of the input sequence and the lack of one or more special characters within the input sequence
automatically generate a common short code comprising a sequence of numeric digits associated with the mnemonic short code; and
display the input sequence comprising the mnemonic short code and the generated common short code in an address field.

17. The computer-readable storage medium of claim 16, comprising executable computer program instructions that when executed enable the computing system to send the outbound message using the common short code as the destination.

18. The computer-readable storage medium of claim 16, comprising executable computer program instructions that when executed enable the computing system to associate numeric digits with the alphabetic characters of the input sequence.

19. The computer-readable storage medium of claim 18, comprising executable computer program instructions that when executed enable the computing system to map each of the alphabetic characters to the numeric digits according to a standard 12-key telephone keypad layout.

* * * * *